March 8, 1932.  H. F. RUMMEL  1,848,550
HEADLIGHT FOR MOTOR VEHICLES
Filed Aug. 3, 1929   3 Sheets-Sheet 1
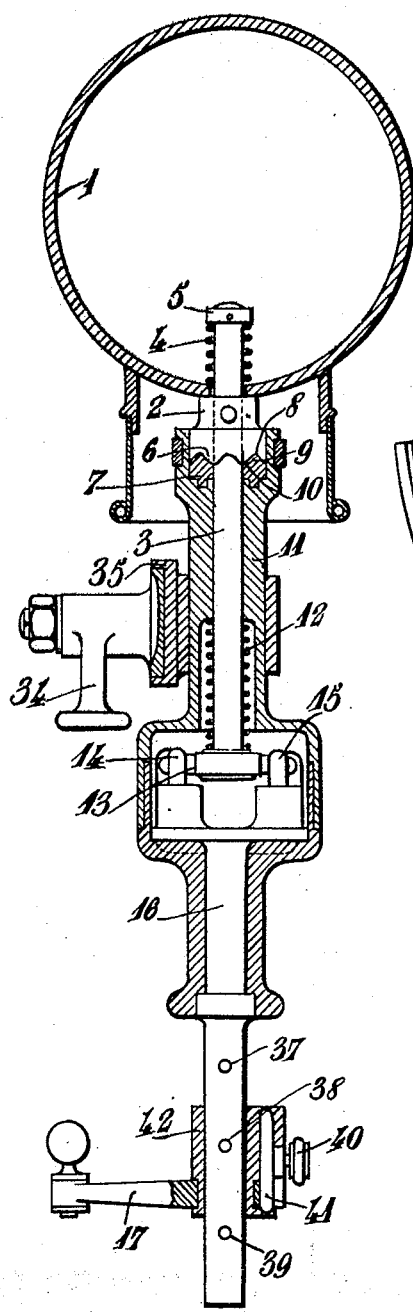
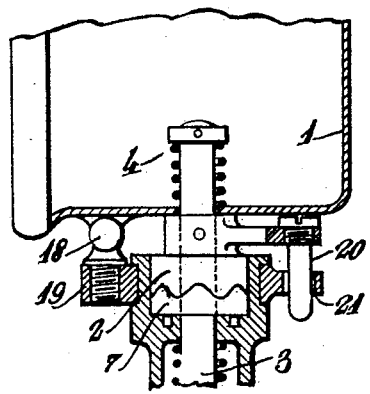
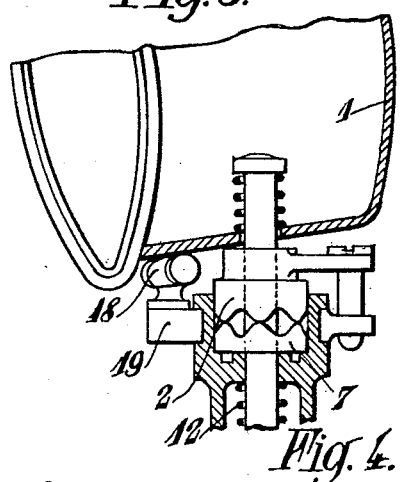
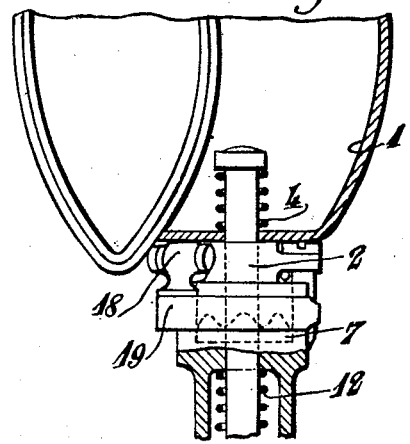
H. F. Rummel
INVENTOR March 8, 1932.   H. F. RUMMEL   1,848,550
HEADLIGHT FOR MOTOR VEHICLES
Filed Aug. 3, 1929   3 Sheets-Sheet 2

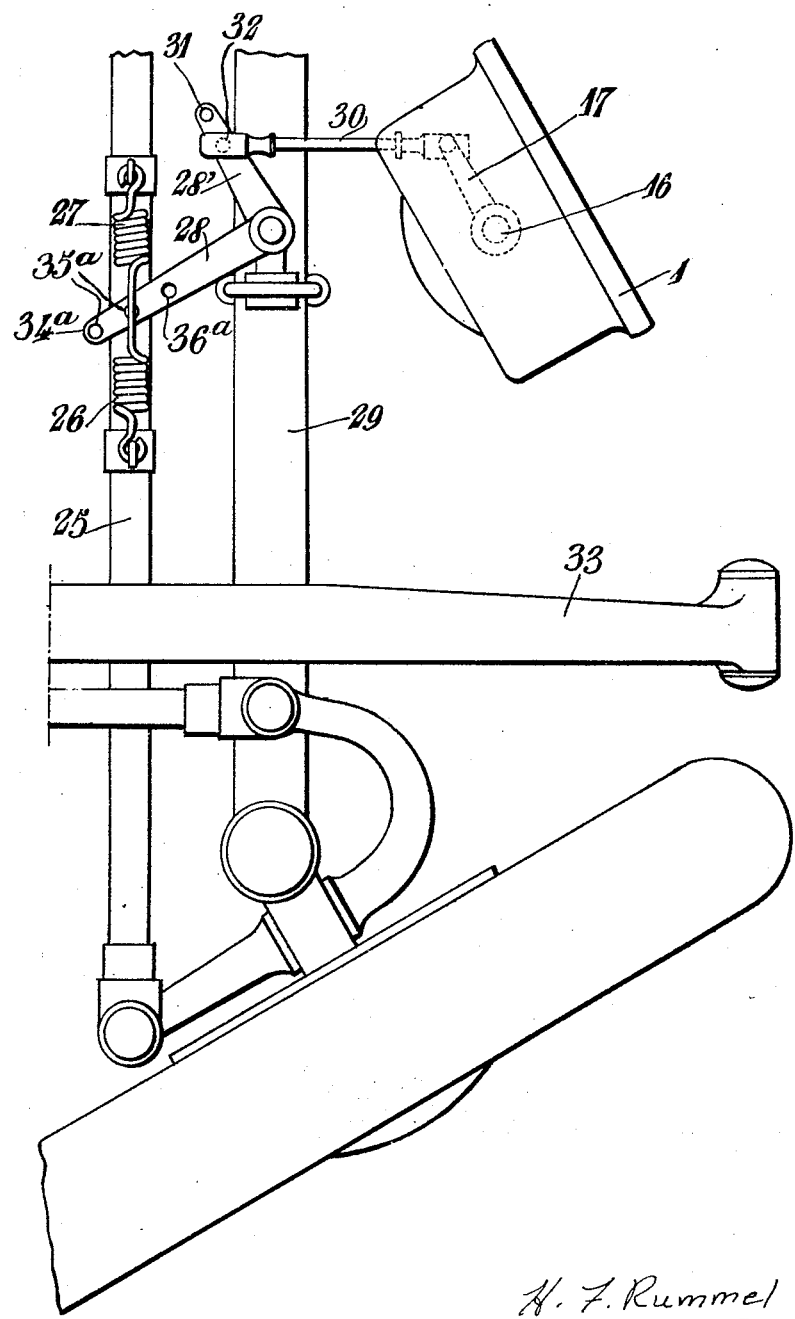

Patented Mar. 8, 1932

1,848,550

UNITED STATES PATENT OFFICE

HENRI FRANÇOIS RUMMEL, OF PARIS, FRANCE

HEADLIGHT FOR MOTOR VEHICLES

Application filed August 3, 1929, Serial No. 383,184, and in France August 5, 1928.

The present invention relates to an improved headlight for motor vehicles arranged so as not to glare into the eyes of the drivers of the cars encountered or crossed on the road and to conveniently light the road particularly when turning.

The said improvements are mainly characterized by the fact that the headlight has imparted thereto both an automatic pivoting motion incident to that of the steering device, and a rocking or tilting motion combined with the first motion and adapted to lead more quickly the luminous wave in the direction of turning.

The automatic pivoting motion of the headlight or headlights is combined with a rocking or tilting motion adapted to convey more quickly the luminous light wave into the direction of turning.

The pivoting motion is obtained by means of suitable levers connecting the axis or shaft of the headlights to the wheel-coupling bar.

The rocking motion is obtained by the reaction of two corrugated washers, one of which is fixed whilst the other rotates with the headlight and is pressed by a spring.

The headlight can take over its drives an advance or lead as regards the pivoting motion through the action of the corrugations of the washers and of the pressure spring, completed by the driving of the headlight-carrying rod secured by catches or tappets imparting their revolving motion to a crossbar.

The levers can be of a varying length so as to accommodate themselves in a standard manner to the most different cars.

The movement of the headlights can be started by a spring button placed in a groove, or by any other suitable means.

Other characteristics of the invention will be disclosed in the following description with reference to the accompanying drawings in which:

Figure 1 is a front view and a section of a headlight according to the invention and its support.

Figures 2, 3 and 4 show the same headlight during the revolving and rocking motion.

Figure 11 shows an example of mounting on a motor car.

Figure 5:
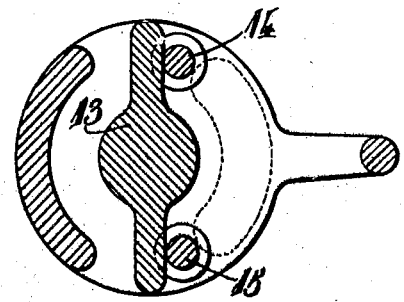
Figures 5, 6, 7 and 8 show, in sectional plan, the details of the internal drive of the headlight during the movement.

With reference to Figure 1, 1 denotes a headlight which is applied against a washer or socket 2 connected to a driving rod 3 by means of a spring 4 maintained by a washer 5. The periphery of the washer 2 opposite the headlight 1 is provided with teeth 6 in the form of undulations or corrugations, the said washer 5 bearing upon a symmetrical washer 7 which is also undulated so that the teeth 6 and the tooth spaces 8 coincide with the teeth 9 and the tooth spaces 10.

The whole is maintained in position in the support 11 by the spring 12. The end of the rod 3 is terminated by a cross bar 13 with which come into contact two driving fingers 14 and 15 connected to a lower rod 16 receiving a reciprocating rotary motion from a lever 17 controlled in turn through a linkage from the steering elements of the vehicle.

In the position of rest, the headlight occupies the position which is represented in Fig. 2; it is yieldingly maintained against the washer 2 by the spring 4.

On the other hand, the same cannot move sidewise relatively to the said washer 2, by virtue of the fact that it is held on one side by a journal 18 fastened in a collar 19 carrying an eye 20 which is engaged by a lug 21 connected to the washer 2.

After the rod 3 has made a certain revolution, as represented in Fig. 3, the washer 2 by the action of its undulated or corrugated shape; in combination with that of the washer 7, is lifted and compresses the spring 12.

The lifting of the washer 2 causes the headlight 1 to swing about its pivot or journal 18.

At this moment, the two washers 2 and 7 are balanced upon their respective teeth but the special cutting of these undulated teeth does not allow the balance to be maintained and the washer 2, under the action of the spring 12, continues its revolving motion started when the same bears automatically by means of its teeth against the washer 6, as shown in Fig. 4. The washer has drawn along in its motion the headlight 1 which has reassumed its original horizontal position.

From the foregoing, it will be seen that for a controlled rotation, equal to about half the pitch of the corrugations, the headlight automatically puts itself in advance of rotation relatively to the rest of the drive.

Figure 9:
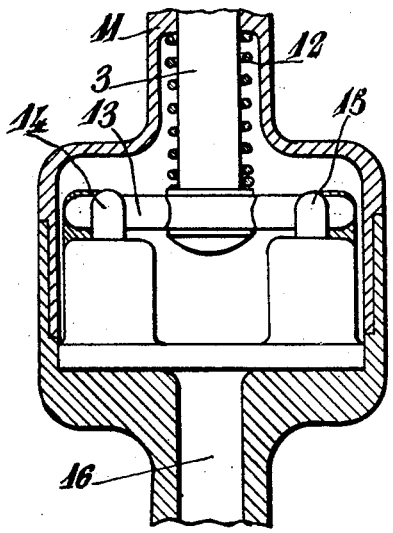
Figures 9 and 10 show, on a larger scale, the same details in elevation.

It is therefore necessary for this drive to be an intermittent one and to leave at a certain moment the headlight entirely free. Such is the purpose of the cross bar 13 and of the fingers 14 and 15 represented on a larger scale in Figures 9 and 10.

Figs. 5, 6, 7 and 8 show in detail the movements of the intermittent drive.

In Fig. 5 the headlight is in normal position, the driving or carrying along fingers 14 and 15 being in contact with the cross bar 13.

Figure 6:
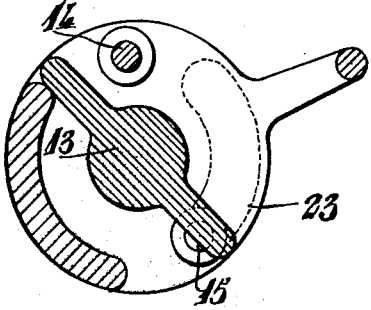
Figure 10:
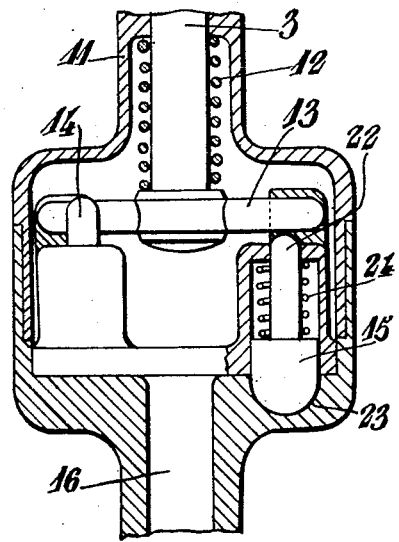

In Fig. 6, the driving fingers 14 and 15 have first of all imparted to the headlight a revolution equal to half the pitch of the corrugations as represented in Fig. 3, but as the headlight is automatically advanced to an extent corresponding to half a pitch, the cross bar 13 leaves the finger 14 comes in contact with the rounded end 22 of the finger 15, causes the latter to move into the groove 23 (Fig. 10).

Figure 7:
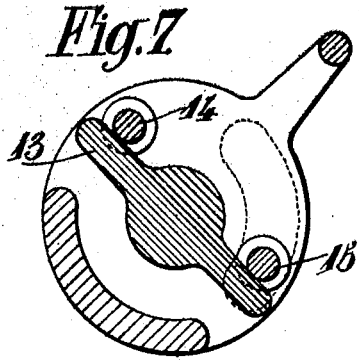

In Fig. 7, when the rotary motion continues, the fingers 14 and 15 again come into contact with the cross bar 13 and the finger 15 is released and reassumes its original position under the action of its spring 24.

Figure 8:
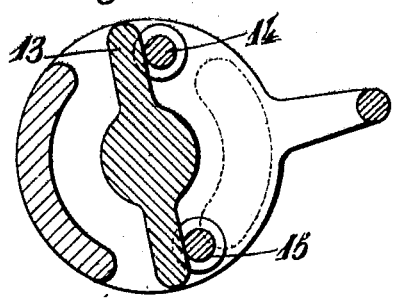

Fig. 8 shows the drive at the half of its return stroke in line with the headlight when the cross bar 13 is still in contact with the fingers 14 and 15 before it automatically reassumes its original position.

Fig. 11 shows one way of mounting a pivoting headlight according to the invention on a motor car.

The coupling bar 25, elastically connected by the springs 26 and 27 to the bent lever 28 articulated to the shaft 29 imparts to the said lever 28 its reciprocating motion at the moment the steering of the wheels is changed, this movement being transmitted through the bar 28' of the lever 28 to a ball and socket joint rod 30 directly connected to the lever 17 fast to the rod 16.

The relative lengths of the levers 28, 28' of the bar 30 and the selection of the holes 31 and 32 allow the headlight to take an advance relatively to the movement of the wheels.

The whole of the headlight properly called is secured to side frame 33, for example, by a bracket 34 (Fig. 1) articulated in a socket 35 connected to the support 11.

This articulation combining itself with the ball and socket joint lever 30 serves to realize the vertical straightening of the headlight support and to compensate the movements of the axle 29 relatively to the side frame 33.

In order to be able to utilize the same device in connection with cars of different sizes the lever 28 is provided with a series of holes 34$^a$, 35$^a$, 36$^a$ according to the various space which can exist between the coupling bar 25 and the axle 29.

To the same purpose, the position of the lever 17 on the rod 16 can be varied according to the holes 37, 38 and 39.

The clutching and unclutching of the lever 17 upon the rod 16, so as to leave the headlight immovable during the day, can be obtained by any suitable means as for instance: A stud 40 engages itself with or disengages itself from a rod 41 and consequently connects the lever 17 with the socket 42 or releases it therefrom.

The mounting of the headlight as it is described can vary in the details of its construction without altering the principle of the invention. For instance, the driving systems of the bar for coupling to the headlight, the connection of the latter with the vehicle, the forms of the undulated teeth, their pitch, can be modified indefinitely.

In the same way, the controlling means or drive can be used in connection with one or several, combined headlights and can derive its motion from any steering organ other than the coupling bar.

It is obvious that the embodiment which has just been described has only been given by way of example and that it is possible to modify in any suitable manner the number, the form, the nature, the arrangement and the mounting of the different detail parts, without departing from the invention.

What I claim as my invention and desire to secure by Letters Patent, is:—

1. In a headlight for motor cars and other purposes, the combination of a vertical shaft, means transmitting the movements of the steering device to said vertical shaft, a second shaft coaxial to the first shaft and disposed in the extension of the latter and above the same, a stationary case surrounding the two shafts and provided with teeth, intermittent connecting means between the said two shafts and allowing the upper shaft to have a certain advance in operation, a sleeve keyed to the said shaft and provided with peripheric teeth cooperating with corresponding teeth connected with the said case so as to impart to and allow the upper shaft to make axial displacements, and articulation means in connection with those of the headlight and of the case so that the headlight will follow in rocking the axial displacements of the said upper shaft.

2. In a headlight for motor cars and other purposes, the combination of a vertical shaft, a system of levers transmitting the motions from the steering device to said vertical shaft, a plate at the upper part of this shaft forming two symmetric recesses relatively to the shaft and an arc forming a stop and positioned opposite said two recesses, a finger capable of passing into everyone of the said recesses and projecting from the latter, elastic means internal to each recess urging the corresponding finger inwardly, a second shaft coaxial with the first shaft and disposed in the extension of the latter and above the same, a cross bar at the lower part of the said second shaft engaged between the said fingers and the said arc forming a stop for the first shaft, a stationary case surrounding the said two shafts and provided with teeth, a sleeve keyed to the upper part of the said second shaft and comprising peripheric teeth cooperating with corresponding teeth of the said stationary case so as to give to the upper shaft and allow the same to make axial displacements, and articulation means connected to the headlight and to the case so as to allow the headlight to follow in rocking the axial displacements of the said upper shaft.

3. In a headlight for motor vehicles and other purposes, the combination with a first vertical shaft of means for connecting the said first vertical shaft to one of the movable steering members so that the said first vertical shaft is displaced angularly relative to the steering function of the wheels of the vehicle, a second vertical shaft coaxial with the said first vertical shaft, a fixed case surrounding the said vertical shafts for constituting a bearing for the said shafts, intermittent connecting means between the said vertical shafts for permitting a relative angular displacement between the said shafts, a sleeve coaxial with the said shafts and keyed to the said second shaft and carrying a cam forming teeth, a second sleeve coaxial with the said vertical shaft and rigidly integral with the said fixed case, the said second sleeve having a cam forming teeth for cooperating with the teeth of the said first sleeve and for ensuring axial displacements of the said second shaft when it is displaced angularly, resiliently distortable means for resiliently connecting the headlight to the said second shaft to which it is angularly connected, and a joint for permitting the rocking of the said headlight around the said joint when the said second shaft is simultaneously displaced angularly and in translation.

4. In a headlight for motor vehicles and other purposes, the combination with a first vertical shaft of a rod system for connecting the said first vertical shaft to the bar for coupling the steering wheels of the vehicle so that the said first vertical shaft is displaced angularly relative to the steering function of the wheels of the vehicle, a second vertical shaft coaxial with the first one and disposed in its extension and above the same, a fixed case surrounding the said vertical coaxial shafts for constituting a bearing for the latter, a transverse rod disposed at the lower end of the said second shaft, stops or abutments integral with the upper end of the said first shaft and from which the distance is greater than the thickness of the said transverse rod which is disposed between the said abutments for permitting a relative displacement of the said rod with regard to the said abutments and consequently an angular displacement relative to the said second shaft with regard to the said first shaft, a first sleeve coaxial with the said shafts and keyed to the said second shaft and the lower edge of which carries a cam forming teeth, a second sleeve coaxial with the said shafts, integral with the said fixed case and the upper edge of which carries a cam forming teeth for cooperating with the teeth of the said first sleeve and for assuring axial displacements of the said second shaft when it is displaced angularly, a spring compressed between an upper head of the said second shaft and the corresponding inner wall of the headlight for resiliently connecting the said headlight to the said second shaft, a ring coaxial with the said shafts and adapted to rotate on the case, means for connecting only angularly the said ring and the said second shaft, a joint adapted to pivot the headlight on the said ring, a second spring interposed between a working surface of the said case and a corresponding collar of the said second shaft for urging same coaxially in the direction of the first shaft and for causing a sudden angular displacement relative to the said second shaft with regard to the said first shaft when the position of coincidence of the ends of the teeth of the said sleeves is interrupted, the relative displacement of the said second shaft with regard to the said first shaft causing in the steering direction a sudden angular displacement of the headlight so that the value of the angular displacement of the said headlight is higher than the angular displacement of the steering.

5. In a headlight for motor vehicles and other purposes, the combination with a first vertical shaft of a system of disengaging levers for imparting when they are engaged angular displacements to the said first shaft relative to the steering displacements, a second vertical shaft coaxial with the first one and disposed in its extension above the same, a fixed case for constituting a bearing for the said shafts and provided in the region of the upper end of the said first shaft and the lower end of the said second shaft for constituting a case and for forming on the internal lower annular face of the said case two cavities forming ramps, a plate disposed at the upper end of the said first shaft and provided for constituting an abutment in the form of an arc and two recesses for a finger capable of moving in each of the said recesses but which may project from the upper part of the said recesses, the lower part of the said fingers being adapted to engage in the cavities of the case in the driving position of the said fingers, resiliently distortable means for driving the said fingers and for engaging their lower ends in the said cavities while for a suitable angular displacement one of the fingers is disposed opposite one of the said cavities forming ramps which act for raising the said fingers and annul the driving thereof for a suitable angular position of the said first shaft, a transverse rod disposed on the lower part of the said second shaft for co-operating, with play, with the said abutment in the form of an arc and the said driving fingers for constituting an intermittent driving means between the said coaxial shafts and for permitting a relative displacement of the said second shaft with regard to the said first shaft, a first sleeve coaxial with the said shafts and keyed to the said second shaft and the lower edge of which carries a cam forming teeth, a second sleeve coaxial with the said shafts and integral with the said fixed case and the upper edge of which carries a cam forming teeth for cooperating with the teeth of the said first sleeve and for ensuring axial displacements of the said second shaft when it is displaced angularly, a spring compressed between an upper head of the said second shaft and the corresponding inner wall of the headlight for resiliently connecting the said headlight to the said second shaft, a ring coaxial with the said shafts and adapted to rotate on the case, means for connecting only angularly the said ring and the said second shaft, a joint adapted to pivot the headlight on the said ring, a second spring interposed between a working surface of the said case for urging the same coaxially in the direction of the first shaft and for causing a sudden relative angular displacement of the said second shaft with regard to the said first shaft when the position of coincidence of the ends of the teeth of the said sleeves is interrupted, the relative displacement of the said second shaft with regard to the said first shaft causing in the steering direction a sudden angular displacement of the headlight so that the value of the angular displacement of the said headlight is higher than the angular steering displacement.

In testimony whereof I have signed this specification.

HENRI FRANÇOIS RUMMEL.